US012501132B2

(12) United States Patent
Chusseau et al.

(10) Patent No.: US 12,501,132 B2
(45) Date of Patent: Dec. 16, 2025

(54) SET-TOP BOX WITH AN INTEGRATED OPTICAL SENSOR AND SYSTEM COMPRISING SUCH A SET-TOP BOX

(71) Applicant: SAGEMCOM BROADBAND SAS, Bois-Colombes (FR)

(72) Inventors: Hugo Chusseau, Bois-Colombes (FR); Radu Nedelcu, Bois-Colombes (FR); Stéphane Delplace, Bois-Colombes (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 75 days.

(21) Appl. No.: 18/532,701

(22) Filed: Dec. 7, 2023

(65) Prior Publication Data

US 2024/0196073 A1   Jun. 13, 2024

(30) Foreign Application Priority Data

Dec. 8, 2022   (FR) .................................. FR2213021

(51) Int. Cl.
*H04N 23/52*   (2023.01)
*H04N 23/51*   (2023.01)
*H04N 23/54*   (2023.01)

(52) U.S. Cl.
CPC ............ *H04N 23/52* (2023.01); *H04N 23/51* (2023.01); *H04N 23/54* (2023.01)

(58) Field of Classification Search
CPC ........ H04N 23/52; H04N 23/51; H04N 23/54; H04N 23/57; H04N 21/41
See application file for complete search history.

(56) References Cited

U.S. PATENT DOCUMENTS

| 6,128,033 A * | 10/2000 | Friedel | H04N 7/15 348/E7.083 |
| 2007/0172230 A1 | 7/2007 | Wernersson | |
| 2010/0192171 A1* | 7/2010 | Dozoretz | H04N 5/64 725/151 |
| 2013/0330066 A1* | 12/2013 | Le | H04N 23/66 396/56 |
| 2014/0085403 A1* | 3/2014 | Ryan | A61B 5/021 348/14.07 |

(Continued)

FOREIGN PATENT DOCUMENTS

| CN | 206350105 U | 7/2017 |
| EP | 1482733 A1 | 12/2004 |

(Continued)

*Primary Examiner* — Jason A Flohre
(74) *Attorney, Agent, or Firm* — MUNCY, GEISSLER, OLDS & LOWE, P.C.

(57) ABSTRACT

A set-top box comprising a housing includes a first main face, a second main face, at least one lateral flank connecting the first lateral face to the second lateral face. The set-top box includes at least one optical sensor the field of vision of which is centred around a given line of vision, said line of vision being inclined vis-à-vis a given plane, when the set-top box is placed on a base, the flank being provided with at least one opening passing through the flank so as to lead to a first end outside of the housing and to a second end inside the housing, the optical sensor being arranged in the housing, such that said line of vision passes through the flank via said opening.

14 Claims, 5 Drawing Sheets

(56) References Cited

U.S. PATENT DOCUMENTS

2015/0106861 A1* 4/2015 Yu .................... H04N 21/43
                                                    725/110
2019/0012544 A1  1/2019 Park et al.
2024/0197130 A1* 6/2024 Xu .................... G06V 10/145

FOREIGN PATENT DOCUMENTS

EP  2533516 A1  12/2012
EP  3328059 A1   5/2018

* cited by examiner

SET-TOP BOX WITH AN INTEGRATED OPTICAL SENSOR AND SYSTEM COMPRISING SUCH A SET-TOP BOX

The invention relates to a set-top box comprising an optical sensor.

The invention comprises a system equipped with such a set-top box.

BACKGROUND OF THE INVENTION (Audio-video) Set-top boxes conventionally make it possible to transmit an audio-video stream, produced by a source, to one or more pieces of audio-video playback equipment, such as a television. The source can of the broadcasting type, (like for example satellite, digital terrestrial television or cable), or also of the OTT (Over The Top, like for example a server connected to the internet) type.

Recently, it is also proposed to go through the set-top box to carry out videoconferences. To this end, the set-top box must be associated with one or more cameras.

A first solution consists of associating with the set-top box, one or more external cameras to be placed above a television and connected to the set-top box by a USB cable.

However, resorting to one or more external cameras is not very practical, since it requires a fixing above the screen of the television, as well as the passage of additional cables.

Moreover, this type of external camera must be placed on the television which is itself subjected to high thermal stresses (the top of televisions being generally hot). This is problematic, since the cameras used do not support high temperature increases.

It has thus been proposed, according to a second solution, to fix a camera which can be oriented directly on the set-top box.

In addition, this type of mechanism makes the camera very perceptible by the user. Yet, users generally prefer that the camera remains discrete to not impede the unpleasant feeling of being observed.

However, this greatly increases the manufacturing cost of the set-top box, in particular if the camera orientation mechanism must be able to resist the vibrations from the speakers optionally integrated in the set-top box.

AIM OF THE INVENTION

An aim of the invention is therefore to propose a set-top box integrating an optical sensor, such that the optical sensor is best protected from the external environment.

SUMMARY OF THE INVENTION

In view of achieving this aim, a set-top box is proposed, comprising a housing, comprising:
A first main face,
A second main face,
At least one lateral flank connecting the first lateral face to the second lateral face.

According to the invention, the set-top box comprises at least one optical sensor, the field of vision of which is centred about a given axis, said axis being inclined vis-à-vis a given plane when the set-top box is placed on a base, the flank being provided with at least one opening passing through the flank, so as to lead to a first end outside of the housing and to a second end inside the housing, the optical sensor being arranged in the housing, such that said given axis passes through the flank via said opening.

The optical sensor is thus arranged directly in the housing of the set-top box which makes it possible to well protect it from the external environment. Furthermore, due to the optical sensor being arranged inside the housing, it has proved to be less visible for a user, which is highly sought.

Advantageously, thanks to the inclination of the optical sensor, it is possible to position relevant images of a user, even if the optical sensor is not at the level of the face of the user. By "relevant", it is understood that the images make it possible to view at least the face of the user in the field of vision of the optical sensor, and preferably to also view the top of the body of the user in the same field of vision.

The invention subsequently makes it possible to be able to ensure a videoconference call.

Optionally, the opening extends longitudinally along a given direction, the optical sensor being arranged, such that the line of vision is parallel with said given direction.

Optionally, the optical sensor is arranged, such that the line of vision is perpendicular to the lateral flank.

Optionally, the optical sensor is arranged, such that the given plane is parallel to at least one of the main faces of the housing.

Optionally, the optical sensor is arranged, such that its line of vision is inclined upwards.

Optionally, the optical sensor is arranged, such that its line of vision forms a given angle with an axis of the plane along which one of the main faces of the housing extends, said angle being between 3 and 13 degrees.

Optionally, the set-top box comprises a support carrying the optical sensor.

Optionally, the support is a printed circuit board.

Optionally, the optical sensor is arranged on the support, such that its line of vision is perpendicular to a main face of the support.

Optionally, the support is mounted on the housing in an inclined manner vis-à-vis the lateral flank.

Optionally, the set-top box comprises at least one protection.

Optionally, the protection covers an end of the opening leading outwards from the housing.

Optionally, the protection is arranged so as to form a continuous plane with the lateral flank.

Optionally, the protection is arranged between an internal face of the housing and the optical sensor.

Optionally, the opening is shaped at least partially with a frustoconical shape.

Optionally, the housing is at least made of two parts.

Optionally, the optical sensor is arranged at the top part of the set-top box.

The invention relates to a system comprising a set-top box such as mentioned above, and means for adjusting the images acquired by the optical sensor.

Other features and advantages of the invention will emerge upon reading the following description of a particular, non-limiting, embodiment of the invention.

BRIEF DESCRIPTION OF THE DRAWINGS

The description of the invention refers to the accompanying drawings, among which.

DETAILED DESCRIPTION OF THE INVENTION

Figure 1:
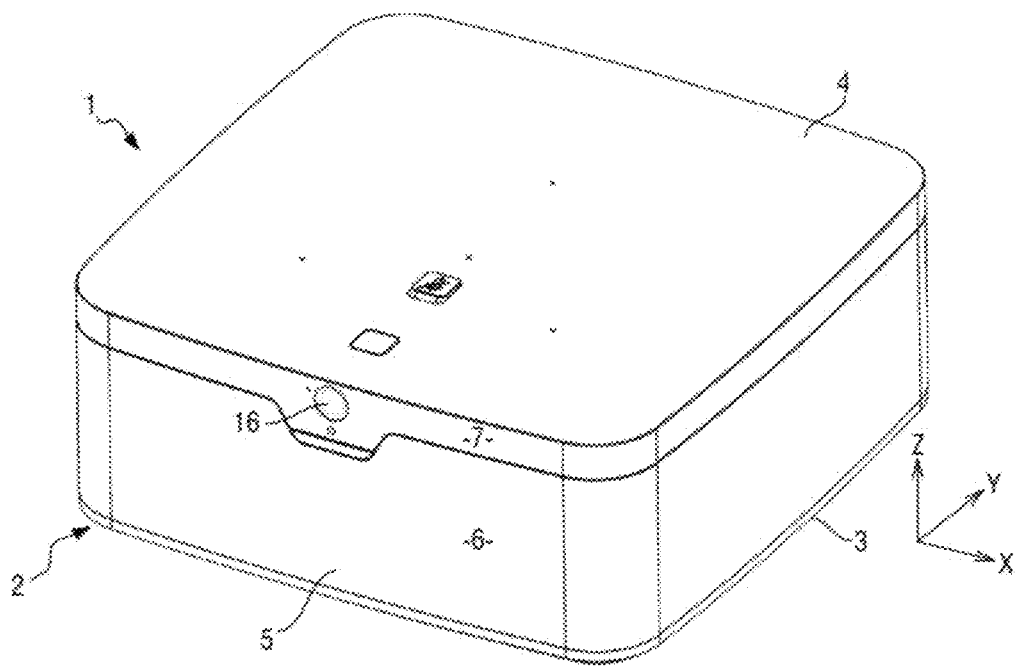
FIG. 1 is a perspective view of a set-top box according to a particular embodiment of the invention.
Figure 2:
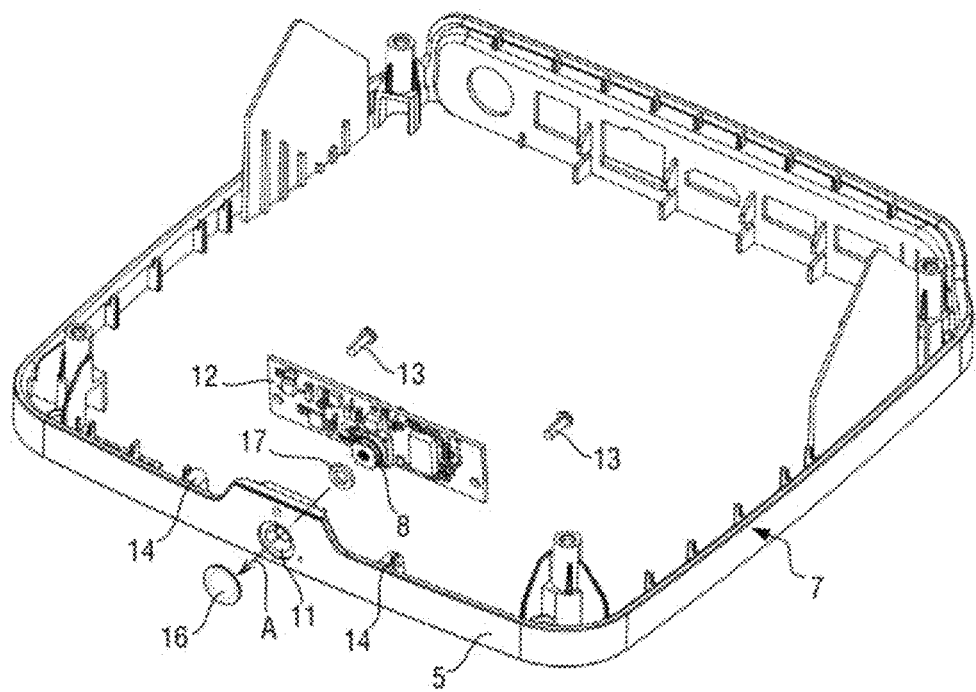
FIG. 2 is a perspective, bottom view of a part of the set-top box illustrated in FIG. 1.
Figure 3:
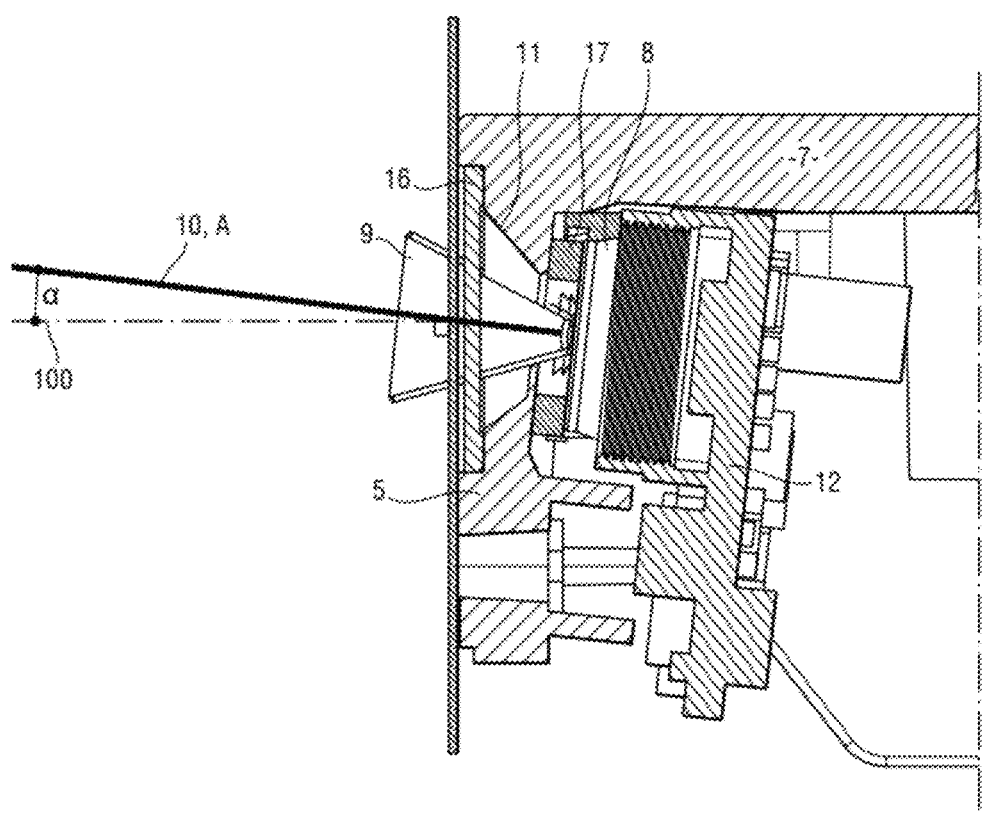
FIG. 3 is a vertical, cross-sectional view of the set-top box illustrated in FIG. 1, the cross-section passing through a given axis associated with the optical sensor of said set-top box.
Figure 4:
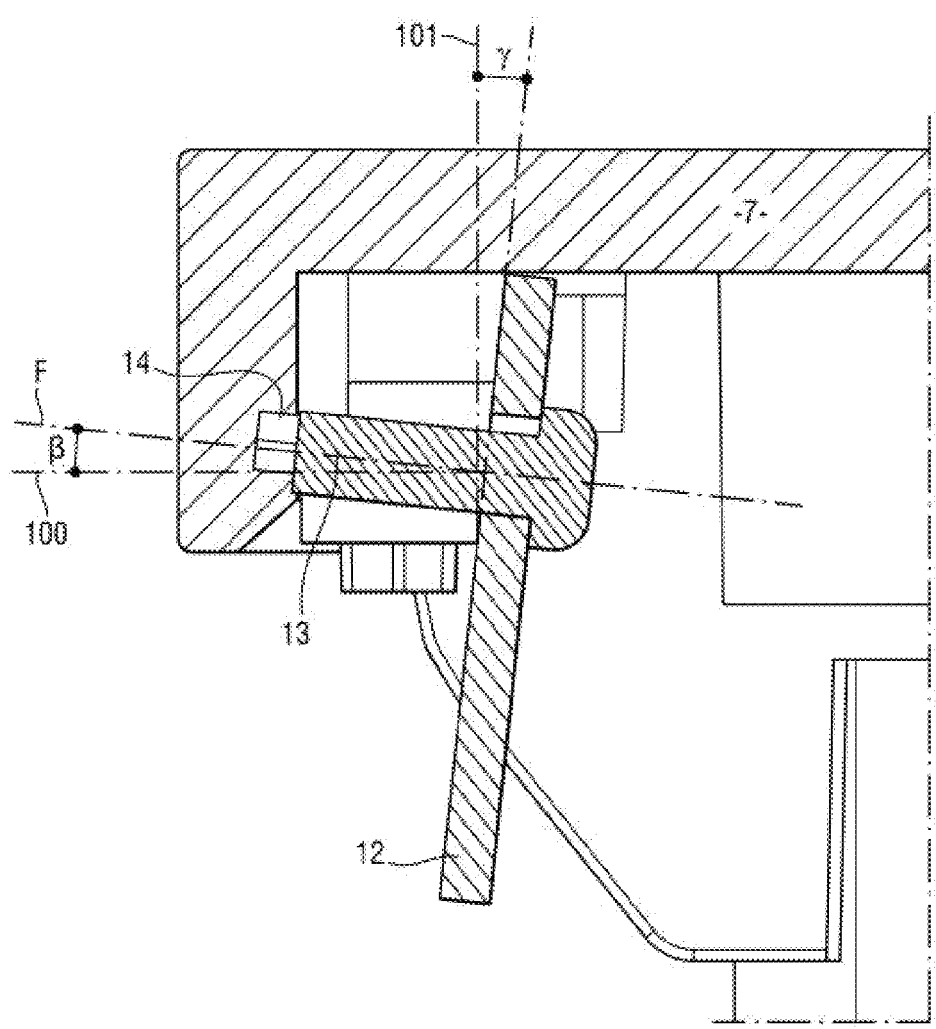
FIG. 4 is a vertical, cross-sectional view of the set-top box illustrated in FIG. 1, the cross-section passing through at least one means for fixing an optical sensor of said set-top box to a cover of said set-top box.

In reference to the different figures, a set-top box 1 according to a particular embodiment of the invention is described. The set-top box 1 is, for example, an (audio-video) set-top box.

The set-top box 1 comprises a housing 2.

The housing 2 comprises a first main face—called lower main face 3 below—that is the face of the housing 2 intended to rest against a base and preferably a piece of furniture, such as for example, a low piece of furniture, and for example, a television stand. The lower main face 3 is, in this case, flat. The lower main face 3 is intended to extend into a horizontal plane, when the lower main face 3 rests against a corresponding horizontal surface of the base.

Below, it occurs that the set-top box 1 rests on said horizontal flat surface by way of its lower main face 3.

The housing 2 moreover comprises a second main face called upper main face 4 below. This upper main face 4 is arranged opposite the lower main face 3.

The two main faces 3, 4 have, in this case, externally one same periphery (in shape and in dimensions). For example, the two main faces 3, 4 are square- or rectangular-shaped.

The housing 2 moreover comprises at least one lateral flank connecting the upper main face 4 to the lower main face 3.

In the present case, the housing 2 comprises four lateral flanks 5 (only one of which is referenced in this case) connecting the two main faces 3, 4 together.

Preferably, the border between two successive flanks 5 is formed by a fillet. Likewise, the edges of the upper main face 4 are rounded. Likewise, the edges of the lower main face 3 are rounded.

Thus, the presence of a sharp edge or corner on the housing 2 is avoided.

In the present case, the two main faces 3, 4 extend in two different planes, but parallel to one another and to a common plane defined by a first axis X and a second axis Y perpendicular to one another. The different flanks 5 also extend parallel two-by-two. Two flanks 5 thus extend parallel to one another and to a common plane defined by the first axis X and a third axis Z, perpendicular to the first axis X and to the third axis Y. Two flanks extend parallel to one another and to a common plane defined by the second axis Y and the third axis Z.

The flanks 5 therefore extend orthogonally to the main faces 3, 4.

Preferably, the height of the flanks 5 (along the third axis Z) is less than the width or the length (along the axes Y and X) of the two main faces 3, 4.

The housing 2 thus mainly has a parallelepiped shape.

Preferably, the housing 2 is made of at least two parts. For example, the housing 2 comprises a base 6 and a cover 7, jointly forming the housing 2.

Preferably, the base 6 and the cover 7 are capable of being interlocked or snap-fitted in one another. Preferably, once the base 6 and the cover 7 are integral with one another, one is fixed to the other by first fixing means comprising, for example, screws.

Typically, the cover 7 forms at least the upper main face 4 and an upper portion of the different lateral flanks. The base 6 forms the lower main face 3 and the complementary portion of the lateral flanks. Preferably, the cover 7 has a height (along the third axis Z) lower than that of the base 6.

Moreover, the set-top box 1 comprises an optical sensor 8.

In a manner known per se, the optical sensor 8 has a field of vision 9 (i.e. the viewing zone that the optical sensor 8 can capture during taking an image) which is centred around a line of vision 10 of the optical sensor 8. Typically, the field of vision 9 has a cross-section (normal cross-sectional plane of the line of vision 10) which is square or rectangular, the cross-section flaring as it is moved away from the optical sensor 8. The field of vision of the optical sensor 8 is therefore, in this case, at least partially a pyramid frustum, the line of vision 10 forming the height of said pyramid. The pyramid has, in this case, a square or rectangular base.

The optical sensor 8 is arranged in the set-top box 1 so as to be fixed with respect to the housing 2.

In this way, this limits the bulk of the optical sensor 8.

Furthermore, the optical sensor 8 is thus less sensitive to vibrations which is highly preferable in the case, optional, in which the set-top box 1 is provided with speakers.

The optical sensor 8 is, for example, a camera and, for example, a camera comprising an electronic sensor (for example, of the CMOS or CCD type) and at least one optical lens.

The optical sensor 8 is fully arranged inside the housing 2.

Typically, at least one opening 11 is provided in one of the lateral flanks 5 of the set-top box 1.

The opening 11 therefore extends on the front of the set-top box 1.

The opening 11 extends through the lateral flank 5 rectilinearly along a direction A.

In the present case, the opening 11 is provided in the cover 7.

The opening 11 is through, so as to lead to a first end inside the housing 2 and to a second end outside of the housing 2.

The opening 11 has a cross-section (along a normal cross-sectional plane of the direction A), which is circular, in this case.

The opening 11 has a cross-section which expands in the direction of the outside of the housing 2.

Thus, the opening 11 is shaped in a cone frustum on at least one section of the opening 11.

The optical sensor 8 is moreover arranged, such that its line of vision 10 extends through the lateral flank 5 from the inside of the housing 2 to the outside of the housing 2 by way of said opening 11. The line of vision 10 is naturally an imaginary line, such that it therefore extends virtually through the opening 11.

Thus, the fact that the optical sensor 8 is moved back inside the housing 2, makes it possible to protect the optical sensor 8 well. In particular, a lens of said optical sensor 8 is thus well-protected from incident light which would limit the quality of the images acquired by the optical sensor 8.

Moreover, the optical sensor 8 is arranged, such that its line of vision 10 is inclined (i.e. neither parallel nor orthogonal) vis-à-vis a given plane. The given plane is, for example, a plane parallel to the upper main face 4 and/or to the lower main face 3.

Thus, preferably, said plane is horizontal when the lower main face 3 rests on the base.

Subsequently, the line of vision 10 is inclined vis-à-vis the horizontal in the present case.

The inclination of the field of vision 9 of the optical sensor 8 vis-à-vis the horizontal advantageously makes it possible to be able to acquire relevant images.

The line of vision 9 is thus also inclined (and not orthogonal) with respect to the lateral flank 5 in which the opening 11 is provided.

Optionally, the line of vision 9 is inclined upwards vis-à-vis the plane in which the lower main face 3 extends.

This makes it possible to be able to acquire relevant images of the user, even if the set-top box 1 is arranged on a low piece of furniture and, for example, a low piece of furniture of between 40 and 80 centimeters in height with respect to the floor.

For example, the optical sensor 8 is arranged, such that its line of vision 10 forms an angle $\alpha$ with a horizontal axis 100 (which is thus normal to the lateral flank 5 passed through by the opening 11) which is between 3 and 13 degrees, and for example, between 4 and 8 degrees, and for example, between 5 and 7 degrees and is, for example, 6 degrees.

Advantageously, by placing the optical sensor 8 in the upper part of the set-top box 1, the value of the angle $\alpha$ to be applied is limited, to compensate for a low position of the set-top box 1, when the base is a low piece of furniture such as a television stand.

Preferably, the direction A in which the opening 11 axially extends is parallel to the line of vision 10 of the optical sensor. Preferably, the direction A is combined with the line of vision 10 of the optical sensor 8.

Thus, the opening 11 and the field of vision 9 of the optical sensor 8 extend coaxially.

This makes it possible for the opening 11 to avoid interfering with the field of vision 9.

It is therefore understood that the direction A also forms the angle $\alpha$ with the horizontal axis 100.

It is therefore understood that the direction A is inclined vis-à-vis the horizontal in the present case.

Preferably, in order to further limit the interferences between the field of vision 9 and the opening 11, the opening 11 is shaped to have a cross-section wider than the corresponding cross-section of the field of vision 9 (for one same normal cross-section plane of the direction A) and this, for at least one section part of the opening 11 (along the direction A) and preferably over the entire length (along the direction A) of the opening 11.

The margin on the dimensions of the opening 11 vis-à-vis those of the field of vision 9 limits the vignetting effects (interference between the housing 2 and the field of vision 9) and/or makes it possible to absorb the potential coaxiality defects between the direction A and the line of vision 10 related to manufacturing and assembly tolerances.

Optionally, for the maximum angle of the field of vision 9 (i.e. the angle of the field of vision 9 which is defined, in this case, by a first edge of the pyramid and a second edge of the pyramid non-successive to the first), a clearance value of the opening 11 (i.e. the value of the half-angle at the top of the cone defining the opening, at least partially) increased by 5 to 20%, and for example, 13 to 17%.

For example, the maximum angle of the field of vision 9 is between 30 and 45 degrees, and for example, between 35 and 40 degrees.

For example, the clearance value of the opening 11 is between 40 and 50 degrees, and is for example, 45 degrees.

According to a preferred embodiment, the set-top box 1 comprises a support 12 carrying the optical sensor. The optical sensor is thus fixed to the support. For example, the optical sensor is welded to the support.

Typically, the support 12 is a printed circuit board.

The support 12 is thus shaped in a plate. Its thickness is therefore a lot less than its two other dimensions. The support 12 thus has two main faces. Said faces are flat. Said faces extend parallel to one another.

The support 12 is itself fixed to the housing 2 and arranged inside the housing 2. The support 12 is, for example, fixed to the cover 7. Preferably, the support 12 is fixed to the cover 7 at the upper main face 4 and/or the lateral flank 5 in which the opening 11 is provided.

To this end, the set-top box 1 comprises second means for fixing the support 12 to the housing 2. For example, the second fixing means comprise at least one screw 13 and the cover 7, at least one corresponding threaded barrel 14, in which the screw 13 is housed. Preferably, the second fixing means comprise at least two screws 13, each being screwed in service into one of the at least two corresponding threaded barrels 14 of the cover 7.

For example, the support 12 comprises at least one through hole, so as to lead to a first end on the first main face of the support 12 and to a second end on the second main face of the support 12, the hole thus extending orthogonally to said faces. Preferably, the support 12 comprises such a hole at a first longitudinal end and such another hole at the other of its two longitudinal ends.

Thus, it suffices to arrange a first screw 13 through one of the support holes 12, then in the corresponding barrel 14 of the cover 7 and the second screw 13 through the other hole of the support in the other barrel 14, to fix the support 12 to the cover 7.

As the optical sensor 8 is thus fully arranged in the housing 2, the support 12 being fixed to the cover 7, it is avoided to have to modify the thickness of the facing lateral flank 5 to arrange the optical 8 inside a potential housing of said lateral flank 5. This would indeed lead to a degradation of the external appearance of said lateral flank 5 with, in particular, the appearance of shrinkages and iridescences which would be damaging. This would further weaken said lateral flank 5.

At least one of the barrels 14 extends rectilinearly and longitudinally in a direction F. Moreover, at least one of the barrels 14 is arranged, such that when the support 12 is fixed to the cover 7 via the barrels 14, the direction F is orthogonal to the plane in which the first main face of the support 12 extends.

According to a particular embodiment, the support 12 is arranged in an inclined manner vis-à-vis the lateral flank 5 carrying the opening 11. Typically, at least one of the barrels 14 is arranged, such that its direction F is inclined by an angle $\beta$ with respect to the horizontal axis 100.

The first main face of the support 12 (that carrying the optical sensor 8) is therefore correspondingly inclined by an angle γ vis-à-vis a vertical plane 101 (parallel to the axes X and Z), the angle γ having a value equal to that of the angle β.

Moreover, the optical sensor 8 is arranged on the first main face of the support 12, such that its line of vision 10 extends orthogonally to said face.

In this way, the optical sensor 8 is actually inclined vis-à-vis the horizontal. It is thus understood that in this case, the angle β is equal to the angle α.

Preferably, the set-top box 1 comprises at least one protection 16 of the optical sensor 8.

The protection 16 is, in this case, arranged so as to block the second end of the opening 11, that opening to the outside of the housing 2. The protection 16 is therefore arranged on the external surface side of the corresponding lateral flank 5.

The protection 16 must naturally be sufficiently transparent to be able to enable the optical sensor 8 to acquire images. The protection 16 is, for example, a window. Optionally, a treatment is applied onto at least one part of at least one of its faces—for example, the external face of the protection 16 is that rotated outwards from the housing 2. The treatment is, for example, an anti-reflective treatment.

The window thus protects the set-top box 1, and in particular, the optical sensor 8, for example, from dust and/or marks.

The possible marks and/or dust which would come to be deposited on the protection 16, due to their expansion with respect to the optical sensor 8, will be less impeding for the image quality than if they were located closer to the optical sensor 8 (even on its surface).

Preferably, the protection 16 is arranged so as to not protrude from the housing 2, and in particular, the external surface of the lateral flank 5. Preferably, the protection 16 is arranged so as to form a continuous plane with the external surface of said flank 5.

This facilitates the cleaning of the set-top box 1 and/or avoids a potential accumulation of dust which could be damaging for the optical performance of the optical sensor 8 (like, for example, a decrease in contrast).

It is therefore understood that to ensure a continuity of the surfaces, the protection 16 extends into the same plane as the external surface of the associated lateral flank 5. Thus, the protection 16 extends in an inclined manner vis-à-vis the line of vision 10 of the optical sensor 8. In service, the protection 16 thus extends vertically.

Figure 5:
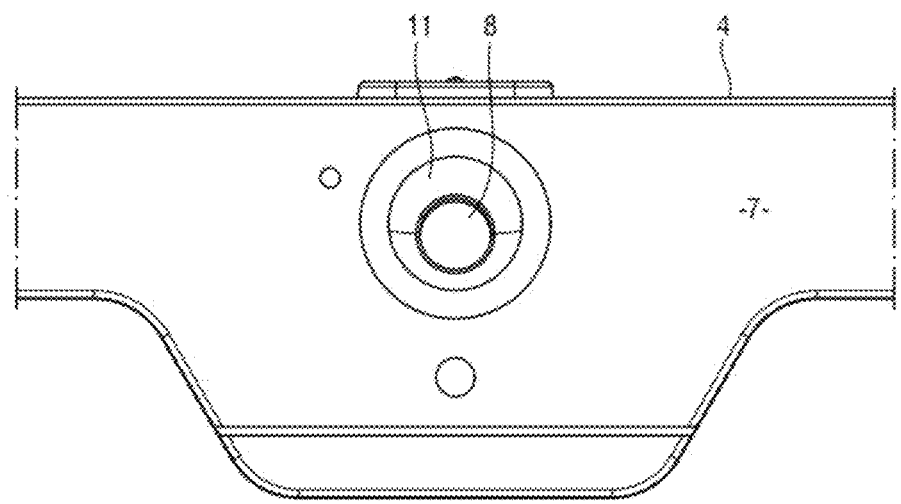
FIG. 5 is a front view of a part of the set-top box illustrated in FIG. 1, without protection of the optical sensor of said set-top box.
Figure 6:
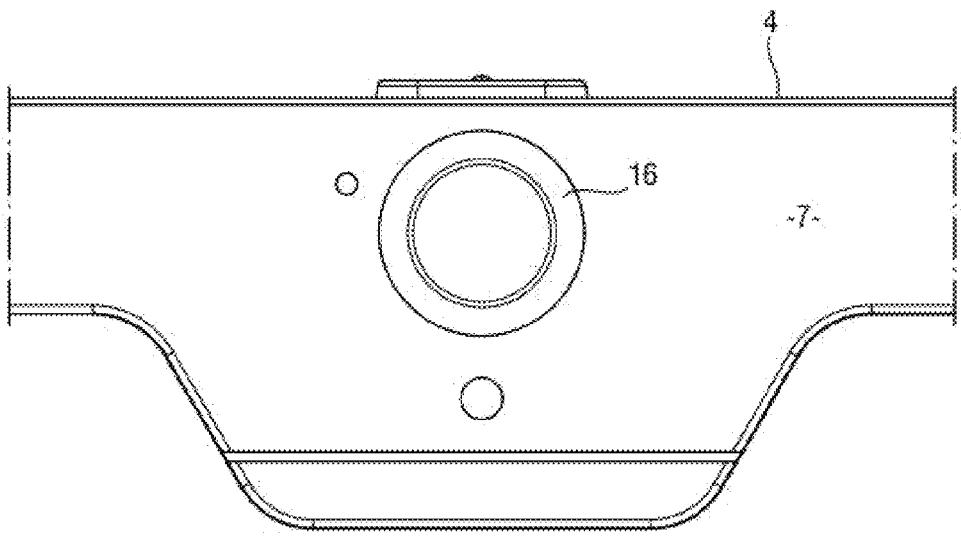
FIG. 6 is a front view of a part of the set-top box illustrated in FIG. 1, with protection of the optical sensor of said set-top box, FIG. 7 schematically illustrates an image acquired by the optical sensor of the set-top box, before and after processing of said image.

Subsequently, as is more visible in FIGS. 5 and 6, the protection 16 avoids the user being able to view the second end of the opening 11 leading onto the external surface of the lateral flank 5 forming an elliptic intersection with said external surface (and non-circular) through the inclination of the opening 11 vis-à-vis said lateral flank 5.

Preferably, the set-top box 1 comprises at least one second protection 17 of the optical sensor 8.

The second protection 17 is, in this case, arranged on the internal surface side of the lateral flank 5 carrying the opening 11. Preferably, the second protection 17 is arranged between said internal surface and the optical sensor 8, so as to be clamped between said internal surface and an end surface facing the optical sensor 8.

It is thus avoided that the optical sensor 8 directly presses against the housing 2, which could damage it, and/or thus avoid dust and/or marks being deposited on the optical sensor 8, in particular, its lens.

The second protection 17 is, for example, made of foam or any other elastically deformable material.

The second protection 17 is transparent and/or pierced to clearly not interfere with the field of vision of the optical sensor 8.

Figure 7:
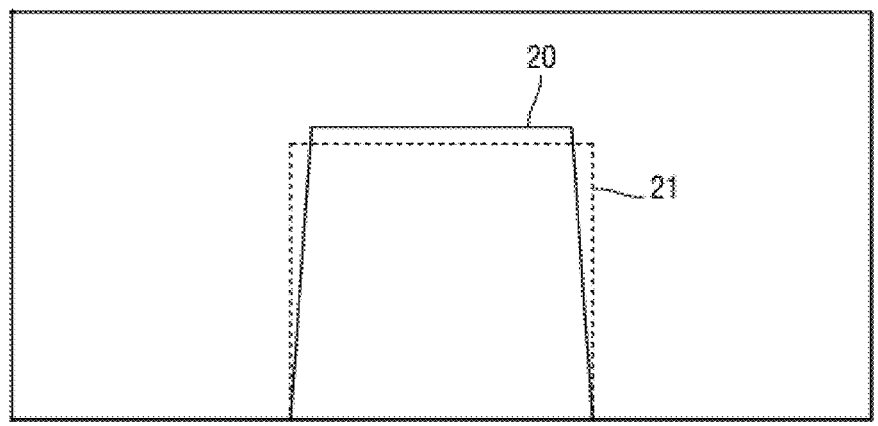

According to another aspect, FIG. 7 illustrates the problem of the deformation due to the inclination of the optical sensor 8: the captured image of a normally rectangular object is represented as a solid line 20. It can therefore be noted that due to the inclination of the optical sensor 8, the object is no longer completely rectangular on the acquired image, by being slightly reduced about the vertical axis. It must be noted that the effect is voluntarily accentuated in FIG. 7 to make the illustration more understandable, the difference being less significant, in fact.

Optionally, to prevent this disadvantage, the set-top box 1 comprises means for adjusting the images acquired by the optical sensor 8.

For example, the adjustment means process images, in order to compensate for the geometric deformations coming from the inclination of the optical sensor 8. In FIG. 7, the correct image of the normally rectangular object is represented as a dotted line.

The processing means, for example, form part of the central processing unit of the set-top box 1 or of the graphic processing unit of the set-top box 1, or also the neural processing unit of the set-top box.

Naturally, the invention is not limited to the embodiment described, but includes any variant entering into the scope of the invention such as defined by the claims.

Thus, the housing can have a shape other than that indicated.

Although, in this case, the two main faces of the housing are identical, the two main faces of the box can be different in shape and/or in dimensions. For example, the additional main face can be of the same shape as the lower main face, but of reduced dimensions.

Although, in this case, the housing does not comprise any sharp angle, the housing can comprise sharp corners or angles. For example, two successive lateral flanks can be joined to one another via an edge (therefore a sharp angle) and/or at least two successive edges of the additional main face and/or of the lower main face can be joined to one another via a sharp edge.

Although, in this case, the two main faces of the housing are parallel to one another, the two faces could not to be parallel to one another. Likewise, the lateral flanks could not to be parallel two-by-two.

Thus, at least one lateral flank could not to extend orthogonally to one or both of the main faces.

The housing can be shaped differently than as a parallelepiped, and can thus be shaped, for example as a pyramid frustum or also as a cube.

The opening could be provided in the base and not in the cover.

The set-top box according to the invention could be integrated with a television, or actually be located in a device offering other functionalities (for example, a games console).

Although, in this case, the field of vision of the optical sensor is a field of vision as a pyramid frustum, the field of vision can be with a frustoconical shape.

Although, in this case, the optical sensor is arranged, such that its line of vision is inclined upwards (i.e. in the direction of the upper main face), the optical sensor can be arranged, such that its line of vision is inclined downwards (i.e. in the direction of the lower main face).

The angle α could have a value other than that indicated.

The support could be a simple plate and not a printed circuit board.

The support could be arranged parallel (and not inclined, like what has been proposed) vis-à-vis the flank in which the opening is provided, the optical sensor thus being arranged, such that its line of vision is inclined (and not orthogonal, like what has been indicated) vis-à-vis one of the main faces of the support.

Although, in this case, the adjustment means are included in the set-top box, the adjustment means could be external to the set-top box. For example, a system could comprise both the set-top box and a remote member integrating the adjustment means, like for example, a remote server.

The adjustment means, whether they form part of the set-top box or not, could perform a total or intermediate correction of the deformation of the images according to the correction ratio of the deformation/loss of targeted resolution. Indeed, the perspective correction will necessarily lead to a loss of resolution—more significant on the part undergoing the most significant correction.

Also, there could be no correction of the images.

The support carrying the optical sensor can comprise components other than the optical sensor, like for example, means for controlling a user/set-top box interface (and, for example, a light interface) of the means for detecting signals coming from a remote control associated with the set-top box.

The invention claimed is:

1. Set-top box comprising a housing comprising:
   a first main face,
   a second main face,
   at least one lateral flank connecting the first main face to the second main face,
   at least one optical sensor the field of vision of which is centred around a given line of vision, said line of vision being inclined vis-à-vis a given horizontal plane, when the set-top box is in service placed on a base, the flank being provided with at least one opening passing through the flank, so as to lead to a first end outside of the housing and to a second end inside the housing, the optical sensor being arranged in the housing, such that said line of vision passes through the flank via said opening,
   wherein the housing is at least made of two parts, the housing comprising a base and a cover jointly forming the housing,
   the set-top box comprising a support carrying the optical sensor, the optical sensor thus being fixed to the support, the support being a printed circuit board, the support being fixed to the cover at an upper main face of the housing, the optical sensor being arranged at the top part of the set-top box, the optical sensor being fully arranged inside the housing.

2. The set-top box according to claim 1, wherein the opening extends longitudinally along a given direction, the optical sensor being arranged, such that the line of vision is parallel to said given direction.

3. The set-top box according to claim 1, wherein the optical sensor is arranged, such that the line of vision is inclined relative to the lateral flank.

4. The set-top box according to claim 1, wherein the optical sensor is arranged, such that the given plane is parallel to at least one of the main faces of the housing.

5. The set-top box according to claim 1, wherein the optical sensor is arranged, such that its line of vision is inclined upwards.

6. The set-top box according to claim 1, wherein the optical sensor is arranged, such that its line of vision forms a given angle with an axis of the plane along which one of the main faces of the housing extends, said angle being between 3 and 13 degrees.

7. The set-top box according to claim 1, wherein the optical sensor is arranged on the support, such that its line of vision is perpendicular to a main face of the support.

8. The set-top box according to claim 1, wherein the support is mounted on the housing in an inclined manner vis-à-vis the lateral flank.

9. The set-top box according to claim 1, comprising at least one protection.

10. The set-top box according to claim 9, wherein the protection covers an end of the opening leading outside the housing.

11. The set-top box according to claim 9, wherein the protection is arranged so as to form a continuous plane with the lateral flank.

12. The set-top box according to claim 9, wherein the protection is arranged between an internal face of the housing and the optical sensor.

13. The set-top box according to claim 1, wherein the opening is shaped at least partially with a frustoconical shape.

14. A system comprising a set-top box according to claim 1, and means for adjusting the images acquired by the optical sensor.

* * * * *